United States Patent
Kinugasa (10) Patent No.: US 10,761,008 B2
(45) Date of Patent: Sep. 1, 2020

(54) PARTICLE DETECTING DEVICE AND CONTROL METHOD FOR THE PARTICLE DETECTING DEVICE

(71) Applicant: AZBIL CORPORATION, Chiyoda-ku (JP)

(72) Inventor: Seiichiro Kinugasa, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 13 days.

(21) Appl. No.: 16/307,666

(22) PCT Filed: May 23, 2017

(86) PCT No.: PCT/JP2017/019242
§ 371 (c)(1),
(2) Date: Dec. 6, 2018

(87) PCT Pub. No.: WO2017/212914
PCT Pub. Date: Dec. 14, 2017

(65) Prior Publication Data
US 2019/0346359 A1 Nov. 14, 2019

(30) Foreign Application Priority Data
Jun. 9, 2016 (JP) .................................. 2016-115717

(51) Int. Cl.
*G01N 15/14* (2006.01)
(52) U.S. Cl.
CPC ................................ *G01N 15/1404* (2013.01)
(58) Field of Classification Search
CPC ............. G01N 15/06; G01N 15/1404; G01N 2015/0693; G01N 15/0205;
(Continued)

(56) References Cited

U.S. PATENT DOCUMENTS

| 7,430,046 B2 * | 9/2008 | Jiang ................. G01N 15/0205 356/336 |
| 2013/0248693 A1 * | 9/2013 | Buchanan, III .......... G01V 8/10 250/222.2 |

(Continued)

FOREIGN PATENT DOCUMENTS

| JP | 2014-153258 A | 8/2014 |
| JP | 2014-228276 A | 12/2014 |
| JP | 2015-511025 A | 4/2015 |

OTHER PUBLICATIONS

International Search Report dated Jun. 27, 2017 in PCT/JP2017/019242 filed May 23, 2017.

*Primary Examiner* — Michael P Stafira
(74) *Attorney, Agent, or Firm* — Oblon, McClelland, Maier & Neustadt, L.L.P.

(57) ABSTRACT

A particle detecting device includes a chamber 30; a first introduction flow path 225 for introducing a particle-containing fluid into the chamber 30; a second introduction flow path 235 for introducing a particle-free fluid into the chamber 30; a light source 10 configured to illuminate fluid in the chamber 30 to detect particles contained in the fluid; a discharge flow path 260 for discharging fluid from the chamber 30; an introduction flow meter 245 configured to measure a flow rate of fluid flowing through the second introduction flow path 235; and a control unit 301 configured to perform control such that a fluid having a total flow rate obtained by adding a predetermined flow rate of fluid flowing through the first introduction flow path 225 to a flow rate of fluid flowing through the second introduction flow path 235, the flow rate being measured by the introduction flow meter 245, flows through the discharge flow path 260.

11 Claims, 5 Drawing Sheets

(58) Field of Classification Search
CPC .. G01N 15/0656; G01N 15/1459; G01N 1/10; G01N 2015/003; G01N 2015/0053; G01N 2015/0662; G01N 2015/0687; G01N 2015/1486; G01N 2021/3595; G01N 2021/6417; G01N 2021/8411; G01N 2035/00881; G01N 21/31; G01N 21/3577; G01N 21/64; G01N 21/643; G01N 21/65; G01N 21/85; G01N 21/8507; G01N 21/94; G01N 33/2858; G01N 33/2876; G01N 33/2888; G01N 35/00871; G01N 15/0606; G01N 15/0618; G01N 15/065; G01N 15/1425; G01N 15/1434; G01N 15/1436; G01N 15/1463; G01N 15/147; G01N 1/00; G01N 1/2208; G01N 1/2252; G01N 2001/2223; G01N 2001/2285; G01N 2015/0011; G01N 2015/0046; G01N 2015/025; G01N 2015/1006; G01N 2015/1075; G01N 2015/1409; G01N 2015/1438; G01N 2015/1493; G01N 2015/1497; G01N 2021/4707; G01N 2021/6439; G01N 2030/027; G01N 2033/4975; G01N 21/49; G01N 21/53; G01N 21/6428; G01N 30/34; G01N 30/36; G01N 30/74; G01J 3/4406
See application file for complete search history.

(56) References Cited

U.S. PATENT DOCUMENTS

2014/0225005 A1    8/2014  Yamasaki
2014/0340681 A1* 11/2014  Murakami ......... G01N 15/1404
                                                  356/337

* cited by examiner

PARTICLE DETECTING DEVICE AND CONTROL METHOD FOR THE PARTICLE DETECTING DEVICE

TECHNICAL FIELD

The present invention relates to an environment evaluation technique, and particularly relates to a particle detecting device and a control method for the particle detecting device.

BACKGROUND ART

In clean rooms, such as bioclean rooms, airborne microbial particles and non-microbial particles are detected and recorded using particle detecting devices. From the result of particle detection, the degree of wear of air-conditioning equipment in the clean room can be ascertained. The record of particle detection performed in the clean room may be attached, as a reference, to products manufactured in the clean room. An optical-type particle detecting device, for example, draws in gas in the clean room and illuminates the drawn-in gas with excitation light. If the gas contains microbial particles or non-microbial fluorescent particles, the particles illuminated by the excitation light emit fluorescence. This allows detection of the numbers and sizes of microbial particles and non-microbial fluorescent particles contained in the gas (see, e.g., PTL 1). There are demands for techniques that allow accurate detection of particles contained in fluid, not only in clean rooms but also in other environments. Here, the term fluid includes liquids as well as gasses.

CITATION LIST

Patent Literature

PTL 1: Japanese Unexamined Patent Application Publication (Translation of PCT Application) No. 2015-511025

SUMMARY OF INVENTION

Technical Problem

In particle detecting devices, the flow speed of a fluid illuminated by excitation light and the flow rate calculated from the flow speed may influence accuracy in detecting particles contained in the fluid. Accordingly, there are standards that relate to the flow speed of a fluid in particle detecting devices. An object of the present invention is to provide a particle detecting device and a control method for the particle detecting device that can easily keep constant the flow rate of a fluid to be inspected.

Solution to Problem

An embodiment of the present invention provides a particle detecting device that includes (a) a chamber; (b) a first introduction flow path for introducing a particle-containing fluid into the chamber; (c) a second introduction flow path for introducing a particle-free fluid into the chamber; (d) a detector configured to illuminate fluid in the chamber and detect particles contained in the fluid; (e) a discharge flow path for discharging fluid from the chamber; (f) an introduction flow meter configured to measure a flow rate of fluid flowing through the second introduction flow path; and (g) a control unit configured to perform control such that a fluid having a total flow rate flows through the discharge flow path, the total flow rate being obtained by adding a predetermined flow rate of fluid flowing through the first introduction flow path to the flow rate measured by the introduction flow meter.

The particle detecting device may further include a suction unit disposed in the discharge flow path and configured to draw fluid out of the chamber, and the control unit may control the suction unit such that the fluid having the total flow rate is drawn out of the chamber.

The particle detecting device may further include a valve disposed in the discharge flow path, and the control unit may control the valve such that the fluid having the total flow rate flows through the discharge flow path.

The particle detecting device may further include a discharge flow meter configured to measure a flow rate of fluid flowing through the discharge flow path.

The particle detecting device may further include a comparing unit configured to compare a difference between the flow rate measured by the introduction flow meter and the flow rate measured by the discharge flow meter, with the predetermined flow rate of fluid flowing through the first introduction flow path.

The particle detecting device may further include a compensation unit configured to reduce the total flow rate in the discharge flow path if the difference between the flow rate measured by the introduction flow meter and the flow rate measured by the discharge flow meter is larger than the predetermined flow rate. The particle detecting device may further include a compensation unit configured to increase the total flow rate in the discharge flow path if the difference between the flow rate measured by the introduction flow meter and the flow rate measured by the discharge flow meter is smaller than the predetermined flow rate.

Another embodiment of the present invention provides a control method for a particle detecting device. The control method includes (a) introducing a particle-containing fluid from a first introduction flow path into a chamber of the particle detecting device; (b) introducing a particle-free fluid from a second introduction flow path into the chamber; (c) discharging fluid from the chamber using a discharge flow path; (d) measuring a flow rate of fluid with an introduction flow meter, the fluid flowing through the second introduction flow path; and (e) performing control such that a fluid having a total flow rate flows through the discharge flow path, the total flow rate being obtained by adding a predetermined flow rate of fluid flowing through the first introduction flow path to the flow rate measured by the introduction flow meter.

In the control method for a particle detecting device, the performing control may control a suction unit in the discharge flow path such that the fluid having the total flow rate is drawn out of the chamber.

In the control method for a particle detecting device, the performing control may control a valve in the discharge flow path such that the fluid having the total flow rate flows through the discharge flow path.

The control method for a particle detecting device may further include measuring a flow rate of fluid with a discharge flow meter, the fluid flowing through the discharge flow path.

The control method for a particle detecting device may further include comparing a difference between the flow rate measured by the introduction flow meter and the flow rate measured by the discharge flow meter, with the predetermined flow rate of fluid flowing through the first introduction flow path.

The control method for a particle detecting device may further include performing compensation that reduces the total flow rate in the discharge flow path if the difference between the flow rate measured by the introduction flow meter and the flow rate measured by the discharge flow meter is larger than the predetermined flow rate. The control method for a particle detecting device may further include performing compensation that increases the total flow rate in the discharge flow path if the difference between the flow rate measured by the introduction flow meter and the flow rate measured by the discharge flow meter is smaller than the predetermined flow rate.

Advantageous Effects of Invention

The present invention can provide a particle detecting device and a control method for the particle detecting device that can easily keep constant the flow rate of a fluid to be inspected.

DESCRIPTION OF EMBODIMENTS

Embodiments of the present invention will now be described. In the drawings mentioned below, the same or similar parts are denoted by the same or similar reference numerals. Since the drawings are schematic representations, specific dimensions and the like are to be determined with reference to the following explanation. Also, it is apparent that dimensional relations and ratios of some parts differ among drawings.

First Embodiment

Figure 1:
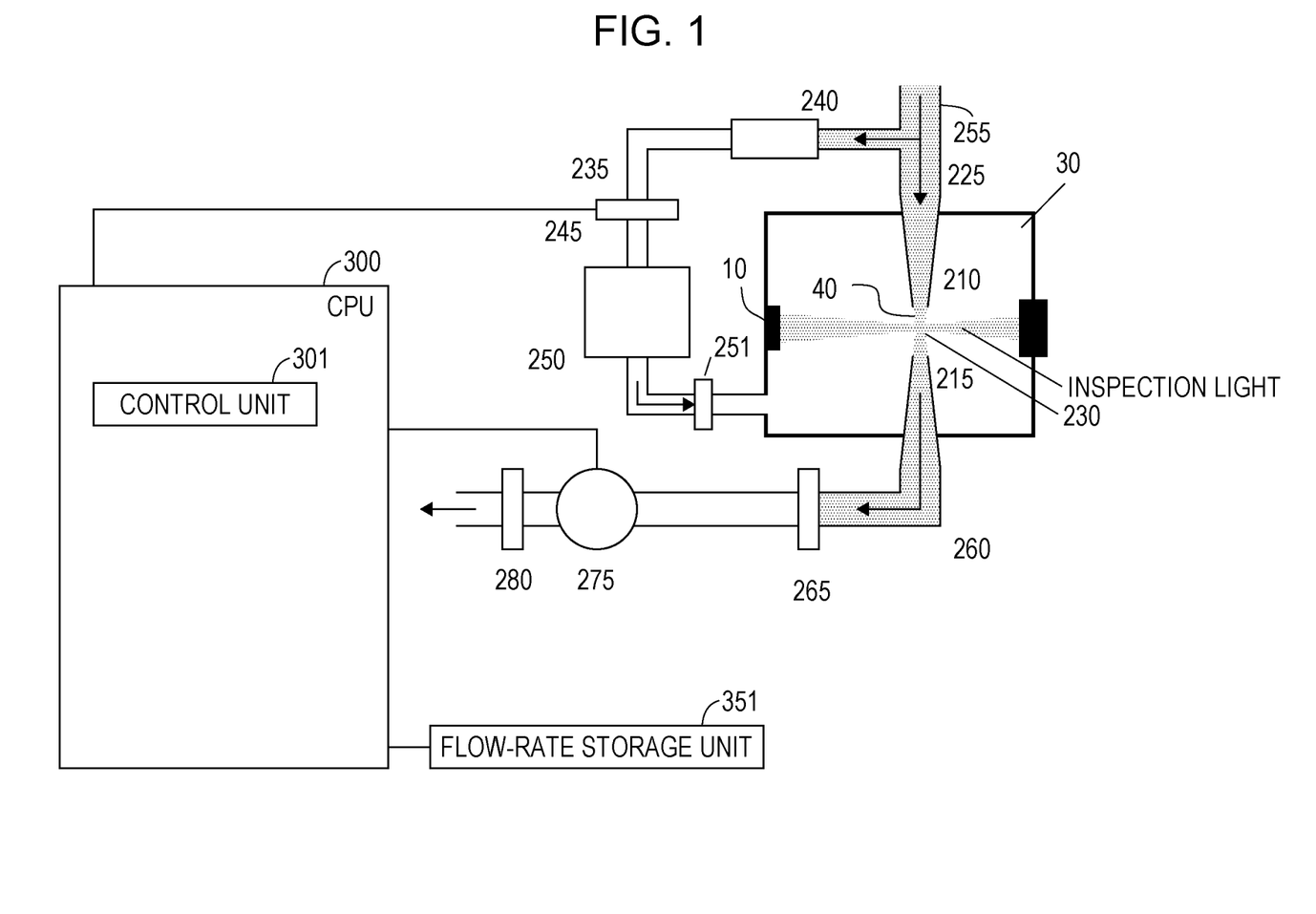
FIG. 1 is a schematic diagram of a particle detecting device according to a first embodiment of the present invention.

As illustrated in FIG. 1, a particle detecting device according to a first embodiment includes a chamber 30, a first introduction flow path 225 for introducing a particle-containing fluid into the chamber 30, a second introduction flow path 235 for introducing a particle-free fluid into the chamber 30, a light source 10 configured to illuminate fluid in the chamber 30 to detect particles contained in the fluid, a discharge flow path 260 for discharging fluid from the chamber 30, an introduction flow meter 245 configured to measure the flow rate of fluid flowing through the second introduction flow path 235, and a control unit 301 configured to perform control such that a fluid having a total flow rate obtained by adding a predetermined flow rate of fluid flowing through the first introduction flow path 225 to the flow rate of fluid flowing through the second introduction flow path 235 measured by the introduction flow meter 245 flows through the discharge flow path 260. The term fluid includes both gasses and liquids. In the following example, the term fluid refers to a gas.

The chamber 30 is provided with an inlet nozzle 210 and an outlet nozzle 215. The inlet nozzle 210 is connected to the first introduction flow path 225. The tip of the inlet nozzle 210 and the tip of the outlet nozzle 215 face each other. An inlet flow path 255 is connected through the first introduction flow path 225 to the inlet nozzle 210. A gas from the inlet flow path 255 passes through the first introduction flow path 225, flows through the tip of the inlet nozzle 210 into the chamber 30, and is discharged from the chamber 30 through the tip of the outlet nozzle 215. The inlet nozzle 210 and the outlet nozzle 215 define the passage of a gas flow 40 in the chamber 30.

The light source 10 illuminates the gas flow 40 (which is a flow of gas to be inspected) with single-wavelength or wide-band wavelength excitation light serving as inspection light. Examples of the light source 10 include a light-emitting diode (LED) and a laser. The excitation light has a wavelength, for example, in the 250 nm to 550 nm range. The excitation light may be either visible light or ultraviolet light. When the excitation light is visible light, the wavelength of the excitation light is, for example, in the 400 nm to 550 nm range and is, for example, 405 nm. When the excitation light is ultraviolet light, the wavelength of the excitation light is, for example, in the 300 nm to 380 nm range and is, for example, 340 nm. The wavelengths of excitation light are not limited to these examples.

The excitation light converges to a point, for example, in the gas flow 40. The region where the excitation light and the gas flow 40 intersect may be called a particle interrogation zone 230.

To prevent particles in the particle interrogation zone 230 between the inlet nozzle 210 and the outlet nozzle 215 from diffusing throughout the interior of the chamber 30, the second introduction flow path 235 is provided to divert part of the gas in the inlet flow path 255 around the first introduction flow path 225 and the tip of the inlet nozzle 210 into the chamber 30. The second introduction flow path 235 is provided with a filter 240, the introduction flow meter 245, a flow regulator 250, and a filter 251.

The filter 240 prevents particles contained in the gas flowing into the second introduction flow path 235 from entering the introduction flow meter 245. The introduction flow meter 245 measures the flow rate of gas flowing through the second introduction flow path 235, and generates an electric signal represented, for example, by voltage or current. A power supply is connected to the introduction flow meter 245. The flow regulator 250, such as an orifice, regulates the flow rate of gas flowing from the second introduction flow path 235 toward the chamber 30. The filter 251 prevents particles which can be contained in the gas flowed through the introduction flow meter 245 and the flow regulator 250 from entering the chamber 30.

The ratio between the flow rate of gas directed toward the first introduction flow path 225 without being diverted from the inlet flow path 255 to the second introduction flow path 235, and the flow rate of gas diverted from the inlet flow path 255 to the second introduction flow path 235, is constant in the normal state.

The second introduction flow path 235 is connected to the chamber 30 at a distance from the particle interrogation zone 230. The total flow rate of gas flowing into the chamber 30 is equal to the sum of the flow rate of gas flowing in from the tip of the inlet nozzle 210 and the flow rate of gas flowing in from the second introduction flow path 235.

The pressure of gas flowing through the second introduction flow path 235 into the chamber 30 prevents the gas flow 40 between the tip of the inlet nozzle 210 and the tip of the outlet nozzle 215 from diffusing throughout the interior of the chamber 30. This prevents particles contained in the gas flowing through the tip of the inlet nozzle 210 into the chamber 30 from diffusing throughout the interior of the chamber 30.

The discharge flow path 260 is connected to the outlet nozzle 215. The discharge flow path 260 is provided with a filter 265, a suction unit 275, and a filter 280. A gas having a flow rate equal to the total flow rate of gas flowing into the chamber 30 is discharged from the chamber 30 through the discharge flow path 260. The filter 265 prevents particles from adhering to the suction unit 275. From the suction unit 275, a negative pressure which is high enough to draw the gas passing across the particle interrogation zone 230 in the chamber 30 into the discharge flow path 260 is supplied to the outlet nozzle 215. This allows pressure in the chamber 30 to exceed pressure in the outlet nozzle 215. Note that pressure in the inlet nozzle 210 is set higher than the pressure in the chamber 30. Examples of the suction unit 275 include a vacuum pump, a fan, a piston pump, and a rotary pump.

Particles to be detected by the particle detecting device include biological substances including microorganisms, cells, chemicals, and dust such as waste, motes, and dirt. Examples of the microorganisms include bacteria and fungi. Examples of the bacteria include gram-negative bacteria and gram-positive bacteria. Examples of the gram-negative bacteria include colon bacilli. Examples of the gram-positive bacteria include *Staphylococcus epidermidis, Bacillus subtilis*, micrococci, and corynebacteria. Examples of the fungi include aspergilli such as black mold. The microorganisms are not limited to those described above.

Figure 2:
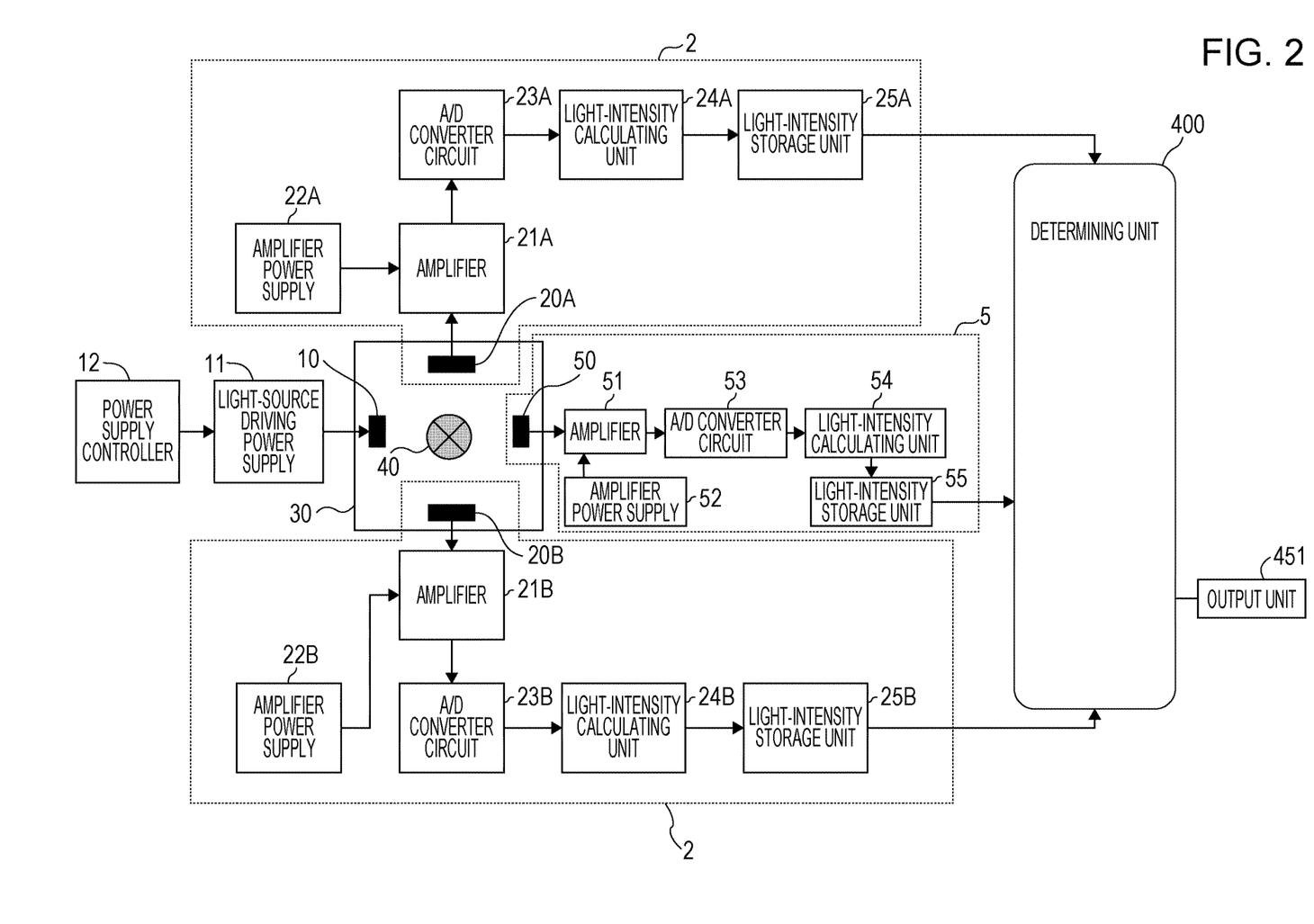
FIG. 2 is another schematic diagram of the particle detecting device according to the first embodiment of the present invention.

As illustrated in FIG. 2, a light-source driving power supply 11 that supplies power to the light source 10 is connected to the light source 10. A power supply controller 12 that controls power supplied to the light source 10 is connected to the light-source driving power supply 11.

When fluorescent microbial particles are contained in the gas flow 40, the fluorescent microbial particles emit fluorescence in response to being illuminated by excitation light. For example, riboflavin, flavin nucleotide (FMN), flavin adenine dinucleotide (FAD), nicotinamide adenine dinucleotide phosphate (NAD(P)H), pyridoxamine, pyridoxal phosphate (pyridoxal 5'-phosphate), pyridoxine, tryptophan, tyrosine, and phenylalanine contained in fluorescent microbial particles emit fluorescence.

When fluorescent non-microbial particles are contained in the gas flow 40, the fluorescent non-microbial particles emit fluorescence in response to being illuminated by excitation light. For example, resin forming the fluorescent non-microbial particles emits fluorescence.

When non-fluorescent particles are contained in the gas flow 40, the non-fluorescent particles illuminated by excitation light do not emit fluorescence.

The spectrum of light in the fluorescence band emitted by microbial particles and non-microbial particles varies depending on the types of microbial particles and non-microbial particles. Typically, the intensity of light in the fluorescence wavelength band emitted by microbial particles is higher than the intensity of light in the fluorescence wavelength band emitted by non-microbial particles on the long-wavelength side. Therefore, on the basis of the intensity of light in the fluorescence band detected at a plurality of wavelengths, a determination as to whether substances, such as particles, contained in the gas are microbial or non-microbial particles can be made.

Microbial particles, fluorescent non-microbial particles, and non-fluorescent particles have shapes that can cause Mie scattering when the particles are illuminated. Therefore, microbial particles and non-fluorescent particles illuminated by excitation light produce scattered light from Mie scattering, in response to being illuminated. The wavelength of scattered light from Mie scattering is equal to the wavelength of excitation light. The intensity of scattered light reflects the sizes of microbial particles and non-fluorescent particles. Therefore, the size of particles can be measured by measuring the intensity of scattered light produced by particles.

The particle detecting device according to the first embodiment includes a fluorescence detector 2. The fluorescence detector 2 detects light in the fluorescence band emitted, for example, by microbial particles. The fluorescence detector 2 includes a first light-receiving element 20A that receives light in a first fluorescence wavelength band, and a second light-receiving element 20B that receives light in a second fluorescence wavelength band different from the first fluorescence wavelength band. The second fluorescence wavelength band is on the shorter wavelength side than the first fluorescence wavelength band. Examples of the first light-receiving element 20A and the second light-receiving element 20B include photodiodes and photomultipliers. Upon receiving light, the first light-receiving element 20A and the second light-receiving element 20B convert optical energy to electrical energy.

An amplifier 21A that amplifies an analog signal generated by the first light-receiving element 20A is connected to the first light-receiving element 20A. An amplifier power supply 22A that supplies power to the amplifier 21A is connected to the amplifier 21A. An analog-to-digital (A/D) converter circuit 23A is connected to the amplifier 21A. The A/D converter circuit 23A converts the analog signal amplified by the amplifier 21A to a digital signal.

A light-intensity calculating unit 24A that calculates the intensity of light received by the first light-receiving element 20A is connected to the A/D converter circuit 23A. The light-intensity calculating unit 24A calculates the light intensity, for example, on the basis of the pulse waveform of the digital signal. A light-intensity storage unit 25A that stores therein the light intensity calculated by the light-intensity calculating unit 24A is connected to the light-intensity calculating unit 24A.

An amplifier 21B that amplifies an analog signal generated by the second light-receiving element 20B is connected to the second light-receiving element 20B. An amplifier power supply 22B that supplies power to the amplifier 21B is connected to the amplifier 21B. An A/D converter circuit 23B is connected to the amplifier 21B. The A/D converter circuit 23B converts the analog signal amplified by the amplifier 21B to a digital signal.

A light-intensity calculating unit 24B that calculates the intensity of light received by the second light-receiving element 20B is connected to the A/D converter circuit 23B. The light-intensity calculating unit 24B calculates the light intensity, for example, on the basis of the pulse waveform of the digital signal. A light-intensity storage unit 25B that stores therein the light intensity calculated by the light-intensity calculating unit 24B is connected to the light-intensity calculating unit 24B.

The particle detecting device according to the first embodiment includes a scattered light detector 5. The scattered light detector 5 detects scattered light produced by microbial particles and non-microbial particles illuminated by inspection light. The scattered light detector 5 includes a scattered-light receiving element 50 that receives scattered light. Examples of the scattered-light receiving element 50 include a photodiode. Upon receiving light, the scattered-light receiving element 50 converts optical energy to electrical energy.

An amplifier 51 that amplifies an analog signal generated by the scattered-light receiving element 50 is connected to the scattered-light receiving element 50. An amplifier power supply 52 that supplies power to the amplifier 51 is connected to the amplifier 51. An A/D converter circuit 53 is connected to the amplifier 51. The A/D converter circuit 53 converts the analog signal amplified by the amplifier 51 to a digital signal.

A light-intensity calculating unit 54 that calculates the intensity of scattered light received by the scattered-light receiving element 50 is connected to the A/D converter circuit 53. The light-intensity calculating unit 54 calculates the light intensity, for example, on the basis of the pulse waveform of the digital signal. A light-intensity storage unit 55 that stores therein the intensity of scattered light calculated by the light-intensity calculating unit 54 is connected to the light-intensity calculating unit 54.

As the gas flow 40 passes, the light source 10 illuminates the gas flow 40 with excitation light. The fluorescence detector 2 then measures the intensity of autofluorescence in a first wavelength band emitted by particles contained in the gas flow 40 and the intensity of autofluorescence in a second wavelength band emitted by particles contained in the gas flow 40, and chronologically stores the measured intensities in the light-intensity storage units 25A and 25B. The scattered light detector 5 measures scattered light produced by particles contained in the gas flow 40, and chronologically stores the intensities of scattered light in the light-intensity storage unit 55. Autofluorescence in the two wavelength bands and scattered light detected at the same time can be regarded as originating from the same particles.

The particle detecting device according to the first embodiment further includes a determining unit 400. The determining unit 400 reads the value of intensity of light in the first fluorescence wavelength band and the value of intensity of light in the second fluorescence wavelength band from the light-intensity storage units 25A and 25B. Also, the determining unit 400 reads the intensity of scattered light from the light-intensity storage unit 55.

If the fluorescence detector 2 does not detect light in the fluorescence band and the scattered light detector 5 detects scattered light, then the determining unit 400 determines that the gas to be inspected contains non-fluorescent particles. If the fluorescence detector 2 detects light in the fluorescence band and the scattered light detector 5 detects scattered light, then the determining unit 400 determines that the gas to be inspected contains fluorescent microbial particles or fluorescent non-microbial particles.

The determining unit 400 compares the intensity of light in the first fluorescence wavelength band with the intensity of light in the second fluorescence wavelength band. If the intensity of light in the first fluorescence wavelength band on the long-wavelength side is higher than the intensity of light in the second fluorescence wavelength band on the short-wavelength side, then the determining unit 400 determines that the gas flow 40 contains fluorescent microbial particles. If the intensity of light in the second fluorescence wavelength band on the short-wavelength side is higher than the intensity of light in the first fluorescence wavelength band on the long-wavelength side, then the determining unit 400 determines that the gas flow 40 contains fluorescent non-microbial particles.

The determining unit 400 outputs a determination result, for example, from an output unit 451. Examples of the output unit 451 include a display, a speaker, and a printer.

The control unit 301 illustrated in FIG. 1 is included, for example, in a central processing unit (CPU) 300. The control unit 301 receives an electric signal generated by the introduction flow meter 245. From the electric signal, the control unit 301 inversely calculates the flow rate of gas flowing through the second introduction flow path 235.

A flow-rate storage unit 351 is connected to the CPU 300. The flow-rate storage unit 351 stores therein a predetermined flow rate of gas flowing through the first introduction flow path 225 and ejected from the inlet nozzle 210. For example, the flow rate of gas ejected from the inlet nozzle 210 is typically set to be constant in the particle detecting device. The flow-rate storage unit 351 stores therein a predetermined flow rate that is set in this manner.

The control unit 301 adds a predetermined flow rate of gas flowing through the first introduction flow path 225, stored in the flow-rate storage unit 351, to the flow rate of gas flowing through the second introduction flow path 235, measured by the introduction flow meter 245, to calculate a total flow rate. The control unit 301 may store the calculated total flow rate in the flow-rate storage unit 351. The control unit 301 appropriately converts the calculated total flow rate into an electric signal, and controls the suction unit 275 such that a gas having the total flow rate is drawn out of the chamber 30.

For example, if the flow rate of gas flowing through the second introduction flow path 235 falls below that in the normal state due to adhesion of particles or the like, a ratio between the flow rate of gas directed toward the first introduction flow path 225 without being diverted from the inlet flow path 255 to the second introduction flow path 235, and the flow rate of gas diverted from the inlet flow path 255 to the second introduction flow path 235, changes.

In this case, if the suction unit 275 continues to draw in gas at a constant total flow rate obtained by adding the flow rate of gas flowing through the second introduction flow path 235 in the normal state to the predetermined flow rate of gas flowing through the first introduction flow path 225, the flow rate of gas ejected from the inlet nozzle 210 exceeds the predetermined value. If the flow rate of gas ejected from the inlet nozzle 210 exceeds the predetermined value, the pulse width of an electric signal generated by a light receiving element upon receiving fluorescence or scattered light from particles contained in the gas may be narrowed or the pulse peak may be lowered.

Also, if the flow rate of gas flowing through the second introduction flow path 235 exceeds that in the normal state due to, for example, damage to at least one of the filter 240, the flow regulator 250, and the filter 251, then a ratio between the flow rate of gas directed toward the first introduction flow path 225 without being diverted from the inlet flow path 255 to the second introduction flow path 235, and the flow rate of gas diverted from the inlet flow path 255 to the second introduction flow path 235, changes.

In this case, if the suction unit 275 continues to draw in gas at a constant total flow rate obtained by adding the flow rate of gas flowing through the second introduction flow path 235 in the normal state to the predetermined flow rate of gas flowing through the first introduction flow path 225, the flow rate of gas ejected from the inlet nozzle 210 falls below the predetermined value. If the flow rate of gas ejected from the inlet nozzle 210 falls below the predetermined value, the pulse width of an electric signal generated by a light receiving element upon receiving fluorescence or scattered light from particles contained in the gas may be widened or the pulse peak may be raised.

Accordingly, if the flow rate of gas ejected from the inlet nozzle 210 changes, the characteristics or statistical values of detected particles also change, and this may make it difficult to accurately evaluate the detected particles. Also, it is difficult to add a flow meter to the first introduction flow path 225 and measure the flow rate of gas ejected from the inlet nozzle 210, because the flow meter may be damaged by particles contained in the gas.

In contrast, in the particle detecting device of the first embodiment, even if the ratio between the flow rate of gas directed toward the first introduction flow path 225 without being diverted from the inlet flow path 255 to the second introduction flow path 235 and the flow rate of gas diverted from the inlet flow path 255 to the second introduction flow path 235 changes, control is performed such that the flow rate of gas drawn in by the suction unit 275 changes in accordance with the change in ratio, and thus, the flow rate of gas ejected from the inlet nozzle 210 can be kept at a predetermined value.

Second Embodiment

Figure 3:
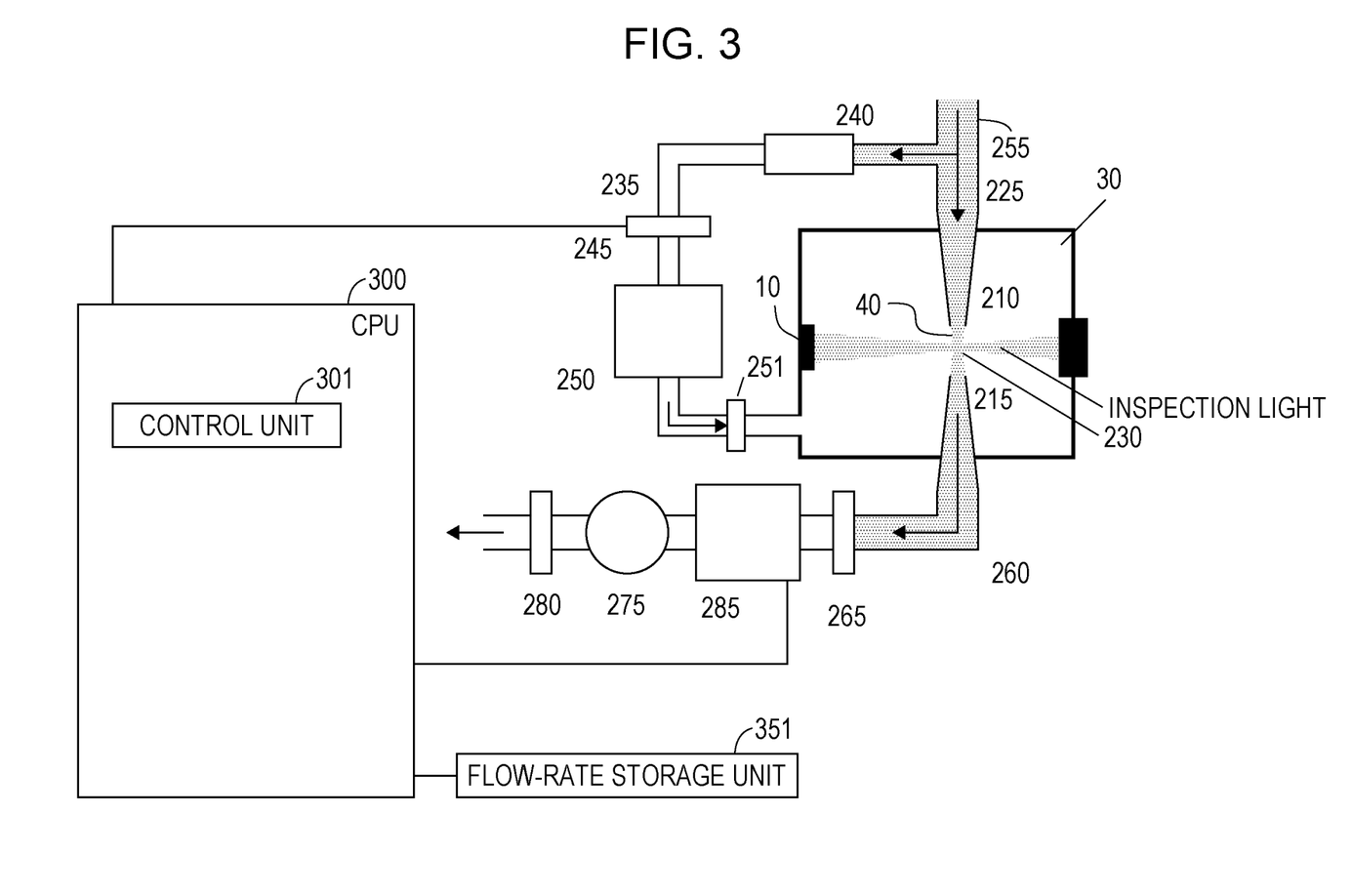
FIG. 3 is a schematic diagram of a particle detecting device according to a second embodiment of the present invention.

As illustrated in FIG. 3, a particle detecting device according to a second embodiment further includes a valve 285 disposed in the discharge flow path 260. The valve 285 is capable of regulating the flow rate of gas flowing through the discharge flow path 260. In the second embodiment, the suction unit 275 draws in gas, for example, at a constant level of power. In the second embodiment, the control unit 301 appropriately converts a total flow rate obtained by adding a predetermined flow rate of gas flowing through the first introduction flow path 225, stored in the flow-rate storage unit 351, to the flow rate of gas flowing through the second introduction flow path 235, measured by the introduction flow meter 245, into an electric signal, and controls the valve 285 such that a gas having the total flow rate is drawn out of the chamber 30.

Other components of the particle detecting device according to the second embodiment are the same as those of the first embodiment. The particle detecting device of the second embodiment is also capable of keeping the flow rate of gas ejected from the inlet nozzle 210 at a predetermined value.

Third Embodiment

Figure 4:
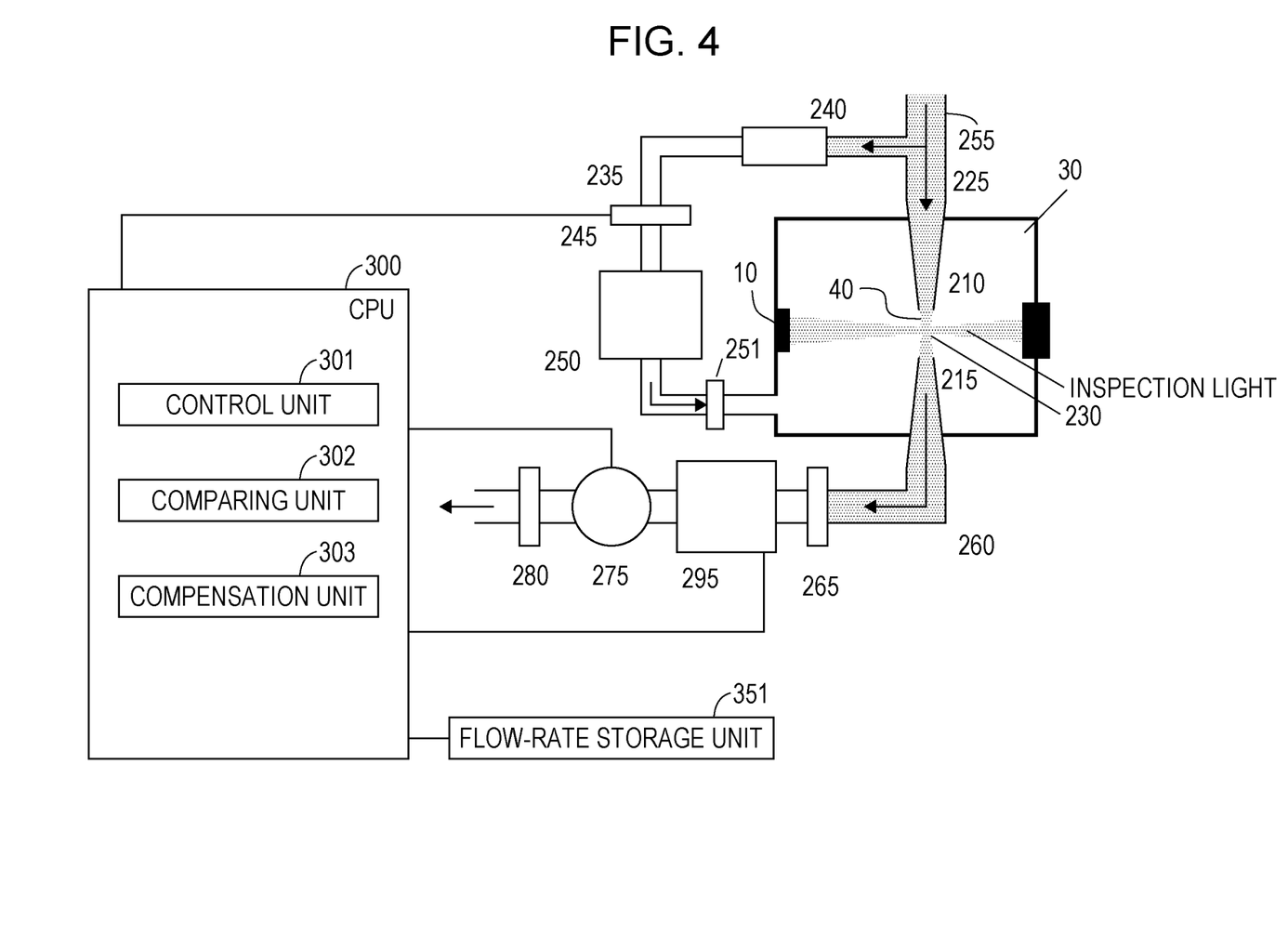
FIG. 4 is a schematic diagram of a particle detecting device according to a third embodiment of the present invention.

As illustrated in FIG. 4, a particle detecting device according to a third embodiment further includes a discharge flow meter 295 disposed in the discharge flow path 260. The discharge flow meter 295 is configured to measure the flow rate of gas flowing through the discharge flow path 260. The particle detecting device further includes a comparing unit 302 configured to compare a difference between the flow rate measured by the introduction flow meter 245 and the flow rate measured by the discharge flow meter 295, with a predetermined flow rate of gas flowing through the first introduction flow path 225 stored in the flow-rate storage unit 351.

The particle detecting device further includes a compensation unit 303. If the difference between the flow rate measured by the introduction flow meter 245 and the flow rate measured by the discharge flow meter 295 is larger than the predetermined flow rate of gas flowing through the first introduction flow path 225 stored in the flow-rate storage unit 351, the compensation unit 303 performs compensation which reduces the total flow rate calculated by the control unit 301. If the difference between the flow rate measured by the introduction flow meter 245 and the flow rate measured by the discharge flow meter 295 is smaller than the predetermined flow rate of gas flowing through the first introduction flow path 225 stored in the flow-rate storage unit 351, the compensation unit 303 performs compensation which increases the total flow rate calculated by the control unit 301. On the basis of the total flow rate obtained by the compensation performed as described above, the control unit 301 controls the flow rate of gas flowing through the discharge flow path 260.

For example, $V_b$ denotes the flow rate of gas flowing through the second introduction flow path 235 measured by the introduction flow meter 245, $V_s$ denotes the predetermined flow rate of gas flowing through the first introduction flow path 225 stored in the flow-rate storage unit 351, and $V_t$ denotes the flow rate of gas flowing through the discharge flow path 260 measured by the discharge flow meter 295. Then, the comparing unit 302 determines whether, as in the following inequality (1), a value obtained by dividing the difference between the flow rate $V_t$ measured by the discharge flow meter 295 and the flow rate $V_b$ measured by the introduction flow meter 245, by the flow rate $V_s$ stored in the flow-rate storage unit 351, is in the range from a lower threshold $T_{h1}$ to an upper threshold $T_{h2}$:

$$T_{h1} \leq |V_t - V_b|/V_s \leq T_{h2} \qquad (1)$$

If the value obtained by dividing the difference between the flow rate $V_t$ and the flow rate $V_b$ by the flow rate $V_s$ is in the range from the lower threshold $T_{h1}$ to the upper threshold $T_{h2}$, the comparing unit 302 determines that the actual flow rate of gas ejected from the inlet nozzle 210 is within the normal range.

If the value obtained by dividing the difference between the flow rate $V_L$ and the flow rate V by the flow rate $V_s$ is below the lower threshold $T_{h1}$, the comparing unit 302 determines that the actual flow rate of gas ejected from the inlet nozzle 210 is below the normal range. In this case, the compensation unit 303 performs compensation which increases the total flow rate calculated by the control unit 301. This increases the flow rate of gas drawn in by the suction unit 275 and allows the actual flow rate of gas ejected from the inlet nozzle 210 to fall within the normal range.

If the value obtained by dividing the difference between the flow rate $V_t$ and the flow rate $V_b$ by the flow rate $V_s$ is larger than the upper threshold $T_{h2}$, the comparing unit 302 determines that the actual flow rate of gas ejected from the inlet nozzle 210 exceeds the normal range. In this case, the compensation unit 303 performs compensation which reduces the total flow rate calculated by the control unit 301. This reduces the flow rate of gas drawn in by the suction unit 275 and allows the actual flow rate of gas ejected from the inlet nozzle 210 to fall within the normal range.

The comparing unit 302 may perform the comparison either continuously or at random or predetermined intervals. The compensation unit 303 may perform compensation either continuously or at random or predetermined intervals. The comparison by the comparing unit 302 and the compensation by the compensation unit 303 may be repeated any number of times or a predetermined number of times.

The inequality used by the comparing unit 302 is not limited to the inequality (1) described above. For example, the comparing unit 302 may determine whether, as in the following inequality (2), the difference between the difference between the flow rate $V_t$ measured by the discharge flow meter 295 and the flow rate $V_b$ measured by the introduction flow meter 245, and the flow rate $V_s$ stored in the flow-rate storage unit 351, is less than or equal to a threshold $T_h$:

$$||V_t-V_b|-V_s|\leq T_h \quad (2)$$

If the left-hand side of the inequality (2) is less than or equal to the threshold $T_h$, the comparing unit 302 determines that the actual flow rate of gas ejected from the inlet nozzle 210 is within the normal range. If the left-hand side of the inequality (2) exceeds the threshold $T_h$, the comparing unit 302 determines that the actual flow rate of gas ejected from the inlet nozzle 210 is outside the normal range.

Other Embodiments

Figure 5:
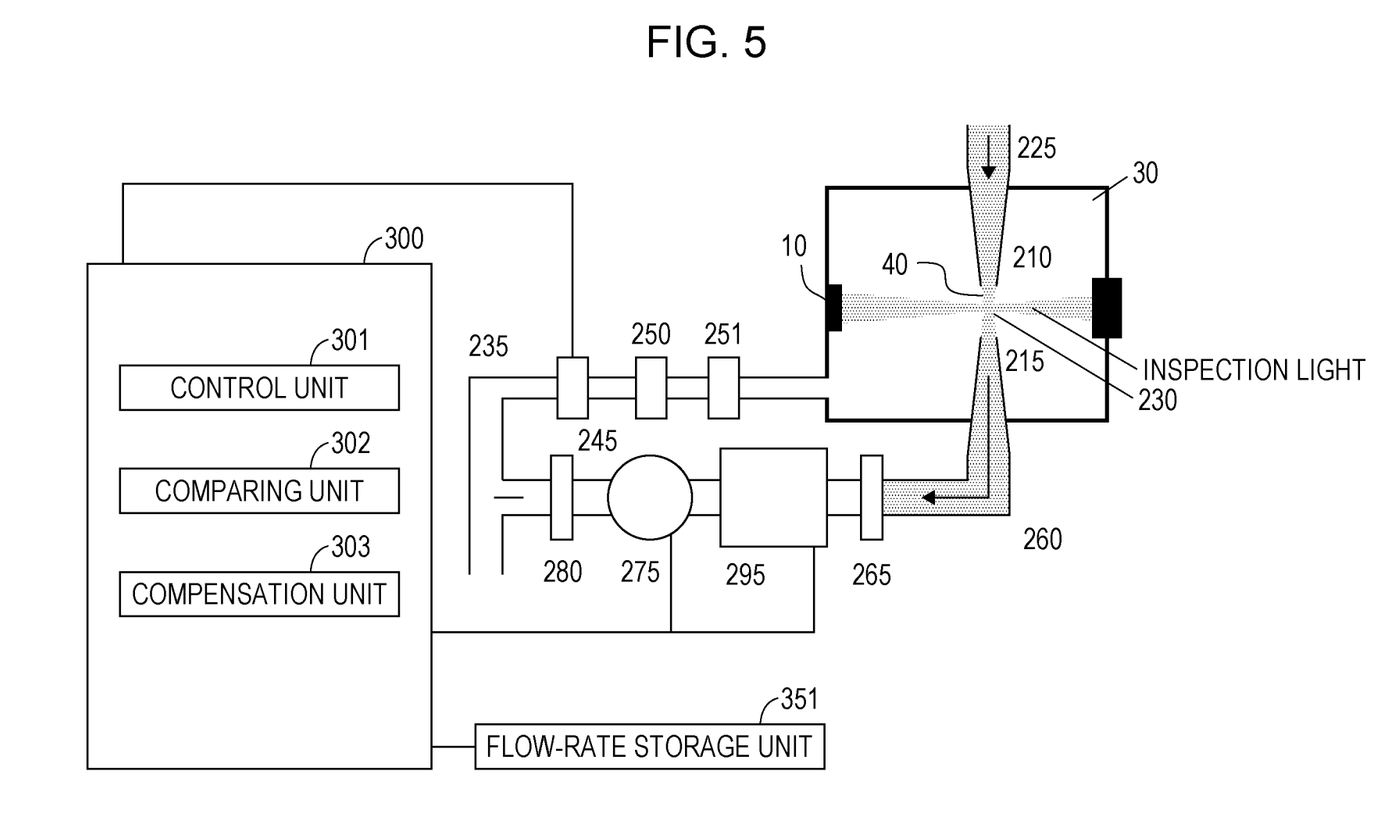
FIG. 5 is a schematic diagram of a particle detecting device according to another embodiment of the present invention.

Although the present invention has been described with reference to the embodiments, the description and drawings which constitute part of this disclosure should not be understood as limiting the present invention. From this disclosure, various alternative embodiments, practical examples, and operations techniques will become apparent to those skilled in the art. For example, although the second introduction flow path 235 branches off the inlet flow path 255 in FIGS. 1, 3, and 4, the second introduction flow path 235 may branch off the discharge flow path 260 as illustrated in FIG. 5. The latter configuration allows reuse of gas from which particles have been removed by the filters 265 and 280 during passage of the gas through the discharge flow path 260. It is to be understood that the present invention encompasses a variety of embodiments not specifically illustrated herein.

REFERENCE SIGNS LIST

2: fluorescence detector
5: scattered light detector
10: light source
11: light-source driving power supply
12: power supply controller
20A: first light-receiving element
20B: second light-receiving element
21A, 21B: amplifier
22A, 22B: amplifier power supply
23A, 23B: A/D converter circuit
24A, 24B: light-intensity calculating unit
25A, 25B: light-intensity storage unit
30: chamber
40: gas flow
50: scattered-light receiving element
51: amplifier
52: amplifier power supply
53: A/D converter circuit
54: light-intensity calculating unit
55: light-intensity storage unit
210: inlet nozzle
215: outlet nozzle
225: first introduction flow path
230: particle interrogation zone
235: second introduction flow path
240, 251, 265, 280: filter
245: introduction flow meter
250: flow regulator
255: inlet flow path
260: discharge flow path
275: suction unit
285: valve
295: discharge flow meter
300: central processing unit
301: control unit
302: comparing unit
303: compensation unit
351: flow-rate storage unit
400: determining unit
451: output unit

The invention claimed is:

1. A particle detecting device, comprising:
a chamber;
a first introduction flow path for introducing a particle-containing fluid into the chamber;
a second introduction flow path for introducing a particle-free fluid into the chamber;
a detector configured to illuminate the fluid in the chamber and detect particles contained in the fluid;
a discharge flow path for discharging fluid from the chamber;
an introduction flow meter configured to measure a first flow rate of fluid flowing through the second introduction flow path; and
processing circuitry configured to receive, from the introduction flow meter, a signal indicating the first flow rate, and automatically perform real-time control of an actuator such that a discharge fluid having a total flow rate that matches a desired total flow rate flows through the discharge flow path, the total flow rate being a sum of a predetermined flow rate of fluid flowing through the first introduction flow path and the first flow rate measured by the introduction flow meter.

2. The particle detecting device according to claim 1, further comprising a suction unit, as the actuator, disposed in the discharge flow path and configured to draw the discharge fluid out of the chamber,
wherein the processing circuitry is further configured to control the suction unit such that the discharge fluid having the desired total flow rate is drawn out of the chamber.

3. The particle detecting device according to claim 1, further comprising a valve, as the actuator, disposed in the discharge flow path,
wherein the processing circuitry is further configured to control the valve such that the discharge fluid having the desired total flow rate flows through the discharge flow path.

4. The particle detecting device according to claim 1, further comprising:
a discharge flow meter configured to measure a second flow rate of the discharge fluid flowing through the discharge flow path,
wherein the circuitry is further configured to receive, from the discharge flow meter, a signal indicating the second flow rate, and compare a difference between the first flow rate measured by the introduction flow meter and the second flow rate measured by the discharge flow meter, with the predetermined flow rate of fluid flowing through the first introduction flow path.

5. The particle detecting device according to claim 4, wherein the processing circuitry is further configured to reduce the total flow rate in the discharge flow path when the difference is larger than the predetermined flow rate.

6. The particle detecting device according to claim 4, wherein the processing circuitry is further configured to increase the total flow rate in the discharge flow path when the difference is smaller than the predetermined flow rate.

7. A control method for a particle detecting device, comprising:
  introducing a particle-containing fluid from a first introduction flow path into a chamber of the particle detecting device;
  introducing a particle-free fluid from a second introduction flow path into the chamber;
  discharging fluid from the chamber using a discharge flow path;
  measuring a first flow rate of fluid with an introduction flow meter, the fluid flowing through the second introduction flow path; and
  receiving a signal indicating the first flow rate from the introduction flow meter, and automatically performing real-time control of an actuator such that a discharge fluid having a total flow rate that matches a desired total flow rate flows through the discharge flow path, the total flow rate being a sum of a predetermined flow rate of fluid flowing through the first introduction flow path and the first flow rate measured by the introduction flow meter.

8. The control method for a particle detecting device according to claim 7, further comprising:
  measuring a second flow rate of the discharge fluid with a discharge flow meter, the discharge fluid flowing through the discharge flow path; and
  receiving a signal indicating the second flow rate from the discharge flow meter, and comparing a difference between the first flow rate measured by the introduction flow meter and the second flow rate measured by the discharge flow meter, with the predetermined flow rate of fluid flowing through the first introduction flow path.

9. The control method for a particle detecting device according to claim 8, further comprising performing compensation that reduces the total flow rate in the discharge flow path when the difference is larger than the predetermined flow rate.

10. The control method for a particle detecting device according to claim 8, further comprising performing compensation that increases the total flow rate in the discharge flow path when the difference is smaller than the predetermined flow rate.

11. The particle detecting device of claim 1, further comprising circuitry configured to determine whether the detected particles are fluorescent particles.

* * * * *